March 2, 1948.  S. MARINO  2,437,202
RAVIOLI MACHINE
Filed Feb. 28, 1945   2 Sheets-Sheet 1

Inventor
Salvatore Marino
by Burton & Burton
Attorney

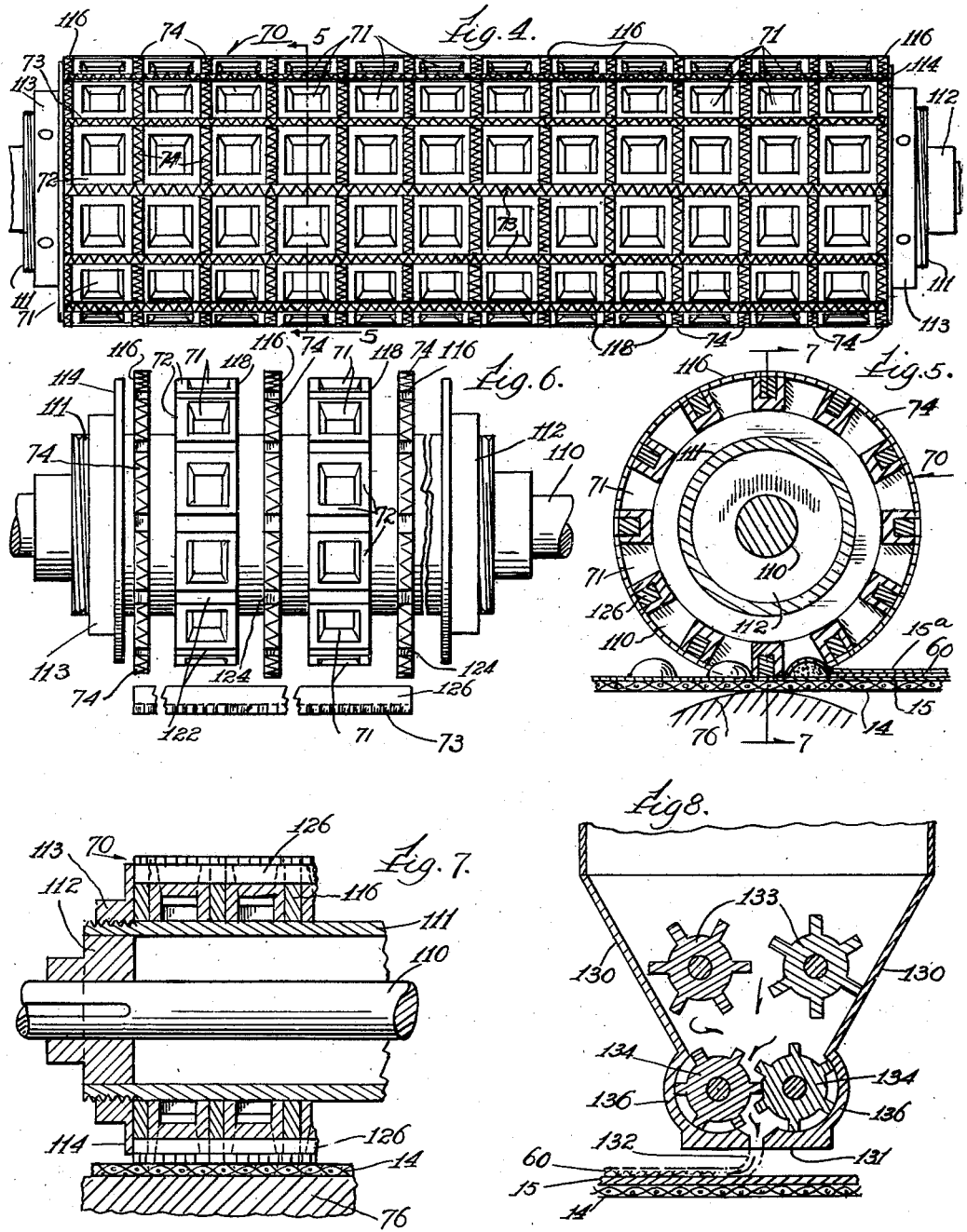
March 2, 1948. S. MARINO 2,437,202
RAVIOLI MACHINE
Filed Feb. 28, 1945 2 Sheets-Sheet 2
Inventor
Salvatore Marino
by Burton & Burton
Attorney Patented Mar. 2, 1948

2,437,202

UNITED STATES PATENT OFFICE 2,437,202

RAVIOLI MACHINE

Salvatore Marino, Chicago, Ill.

Application February 28, 1945, Serial No. 580,159

10 Claims. (Cl. 107—1)

1

This invention relates to a machine for manufacturing ravioli and one object of the invention is to provide a machine for assembling the layers of dough and filling material which constitute this food product and for forming and separating the ravioli units all without the necessity of handling the same and in a generally automatic manner.

Another object of the invention is to provide a convenient form in which the dough may be prepared for use in the machine and placed therein in unit quantities which are readily renewable as required.

It is also an object of the invention to provide a forming roll for pressing the ravioli into its final shape and to incorporate in said roll cutting means for completely separating the individual ravioli from each other.

An additional object of the invention is to provide an effective mechanism for pressing the filling material from a container onto a sheet of dough in a uniform layer together with convenient means for operating the mechanism in reverse and moving it clear of the container to permit refilling the latter.

Other objects and advantages of the invention will appear from the following description taken in connection with the drawings, in which:

Fig. 4 is a face view of the forming cylinder with cutting blades carried thereby.

Fig. 5 is a transverse sectional view of the cylinder taken as indicated at line 5—5 on Fig. 4.

Fig. 6 is a fragmentary and partially disassembled view showing typical elements of the cylinder arranged in position for their final assembly.

Fig. 7 is a fragmentary detail section taken as indicated at line 7—7 on Fig. 5.

Fig. 8 is a vertical sectional view showing a modified form of feed hopper for the filling material.

While there is shown and described herein certain specific structure embodying this invention it will be evident to those skilled in the art that various additional modifications and rearrangements of the parts may be made within the scope of the invention and as indicated by the appended claims.

2

Figure 1:
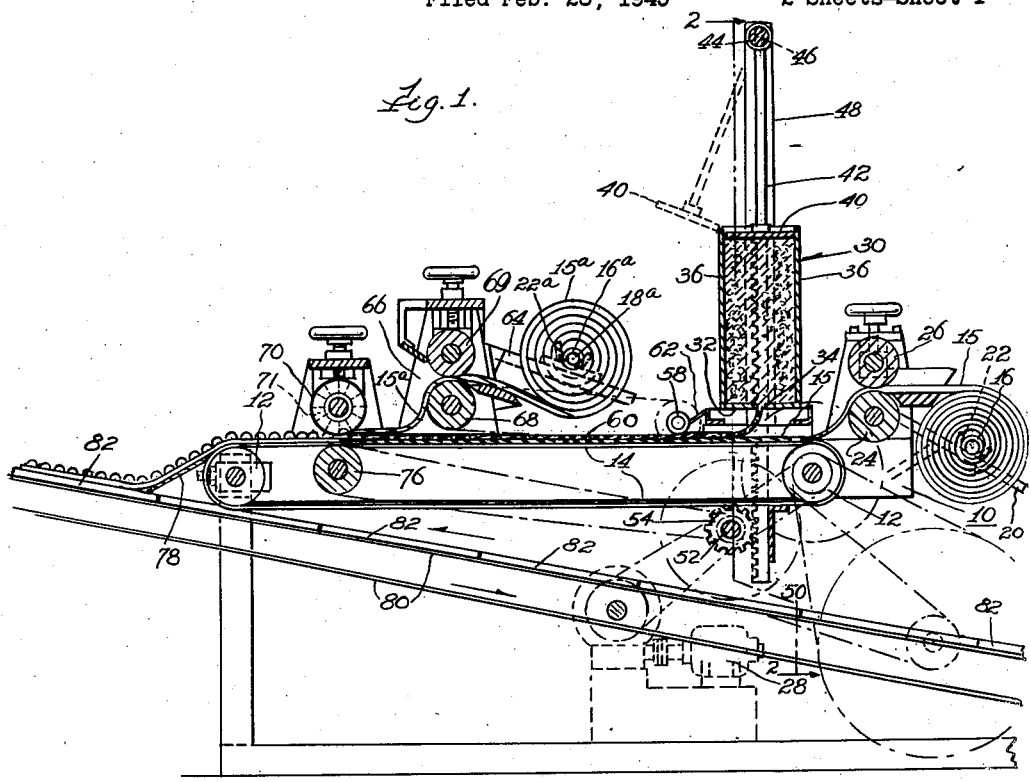
Fig. 1 is a somewhat diagrammatic and partly vertical sectional view of a ravioli machine embodying this invention.

The machine herein illustrated as embodying this invention is shown somewhat diagrammatically to facilitate a ready understanding thereof and it will be understood that particularly as to the parts shown in Fig. 1 the proportions thereof and to some extent the forms thereof may be varied as occasion requires. The drawing shows a horizontal frame member 10 in which there are journaled a pair of rollers 12, 12 carrying an endless apron 14 which is preferably a fabric or similar material having a limited degree of compressibility. The dough from which the ravioli is to be made is prepared in the usual manner by a conventional machine such as a "breaker" but instead of being delivered from that machine in the form of a ball or lump of dough it is delivered in a sheet 15 and wound spirally onto a roller 16 having trunnions 18, 18 projecting at both ends and beyond the margins of the sheet 15 wound on the roller. A pair of bracket arms 20, 20 extend from one end of the frame 10 and are provided with upwardly open cradles or bearings 22 to receive the trunnions 18. With the sheet thus mounted the end of the sheet is fed between squeezing rolls 24, 26 which serve to reduce its thickness to the desired amount, usualy about ⅛", and which feed the dough forward from the supply on the roller 16 onto the endless apron 14. It may be understood that the rolls 24, 26 are power driven from the same power source, such as the motor indicated at 28, which drives the apron 14 and that the feed rolls 24, 26 are thus driven in timed relation to the speed of travel of the apron 14. The sheet of dough 15 is thus carried forward on the apron under a receptacle or container 30 from which the filling material (usually consisting of comminuted meat or vegetables or a combination thereof with various flavoring condiments) is fed onto the upper surface of the sheet 15.

As shown the container 30 includes a bottom wall 32 having a slot at 34 through which the material is fed and having four upstanding parallel side walls 36 and 38 giving the container a rectangular cross-section which is uniform from top to bottom. A piston or plunger 40 is snugly fitted to this cross-section for reciprocation vertically in the container 30 and is connected by links 42 to a cross bar 44. The flattened ends of the cross bar indicated at 46, 46 are guided in vertically slotted guide frames 48 upstanding from the frame 10 at opposite sides of the container 30 and these end portions 46, 46 of the cross bar 44 are connected to rack bars 50, 50 which are also guided for reciprocation in the frame members 48, 48. Below the apron 14 there is journaled a shaft 52 having pinions 54, 54 fixed thereon and said pinions mesh with the rack bars 50, 50, so that rotation of the shaft 52 in the proper direction will move the rack bars 50, 50 downwardly, carrying with them the cross bar 44 and the plunger 40. By suitable speed reducing gearing this downward travel of the plunger 40 is arranged to occur continuously as the sheet of dough 15 moves under the feed slot 34 of the container 30 so that the filling material indicated at 60 in the container 30 is delivered in a continuous uniform layer onto the upper surface of the dough 15. A roll 58 driven continuously at a somewhat slower peripheral speed than that at which the sheet of dough is traveling is disposed just beyond the position of the container 30 and serves to smooth down the layer of filling material just delivered onto the sheet of dough 15. Preferably the underside of this roll 58 moves in the same direction as the apron 14. Any of the filling material adhering to the surface of the roll 58 is promptly removed by a scraper blade 62.

For completing the assembly another layer of dough is required. This is supplied in the form of a sheet 15a similar to the sheet 15 and rolled in spiral form on a roller 16a having trunnions 18a which are supported in upwardly open bearings 22a carried by bracket arms 64 extending from the frame of the machine. This frame includes uprights 66 in which the squeezing rolls 68 and 69 are journaled just ahead of the position of the sheet 15a as seen in Fig. 1. This sheet 15a is fed between the rolls 68, 69 which reduce its thickness in the same manner as the rolls 24, 26 operate to reduce the thickness of the sheet 15 and from the rolls 68, 69 the sheet 15a is delivered onto the sheet 15 with its layer of filling material 60 as it is propelled forward by the apron 14. The complete assembly consisting of the upper and lower layers of dough and the interposed layer of filling material is then carried by the apron 14 under the forming roll 70 which is shown in some detail in Fig. 4.

The forming roll 70 is provided with a plurality of outwardly open pockets 71 which are arranged in rows extending parallel to the axis of the roll and which are also alined circumferentially in circular series. Each pocket is separated from all the adjacent pockets by cutting blades which are preferably of corrugated form and which serve to separate the assembled layers of dough and filling material into individual ravioli units which are generally square in shape with scalloped edges formed by the corrugated cutting blades. Around the margins of each pocket 71 and inside the area bounded by the corrugated cutting blades the forming roll or cylinder 70 presents smooth faces or areas 72 which serve to press the marginal portions of the upper and lower layers of dough 15 and 15a together so as to more or less seal between them a small quantity of the filling material which causes the upper layer 15a of the dough to bulge into the pocket or recess 71 as the assembled material passes under the forming roll 70. The corrugated blades 73 extend longitudinally of the roll 70 and the circular cutting blades 74 are disposed at each end of the roll and between adjacent circular series of the pockets 71 and these cutting blades project beyond the surfaces 72 by an amount corresponding to the thickness of the margin of a ravioli unit when it is fully formed. The corrugated cutting blades 73 and 74 run substantially in contact with the apron 14 with a supporting roller 76 disposed below the apron 14 and directly under the roll 70 so that the blades will cut through both layers of dough and even slightly indent the fabric apron 14 to insure severance of the dough into individual ravioli units. These units are then carried along by the continued movement of the apron 14 until as the apron passes around its supporting roller 12 the units slide onto a transfer bridge 78 for final delivery.

Under the frame 10 of the machine there is mounted a continuously traveling conveyor belt 80 which is shown as inclined upwardly toward the transfer bridge 78 and which carries on its upper ply a series of rectangular trays 82 which are placed on the conveyor manually as needed. The conveyor belt 80 travels at substantially the same rate as the apron 14 so that one of the trays 82 is presented in position to receive the ravioli units as they arrive along the bridge 78. And at this point an attendant removes the trays 82 as they become filled and adjusts them if necessary to receive the continuously arriving supply of ravioli units. The trays 82 may be of any convenient construction; for example they may be formed with rectangular wooden frames and with bottoms of wire screen cloth or the like since they serve merely as temporary carriers for the ravioli units. A plurality of such trays may be stacked on a truck and moved to a cooking vat into which the ravioli units are dumped from the trays for the usual cooking treatment.

Figure 2:
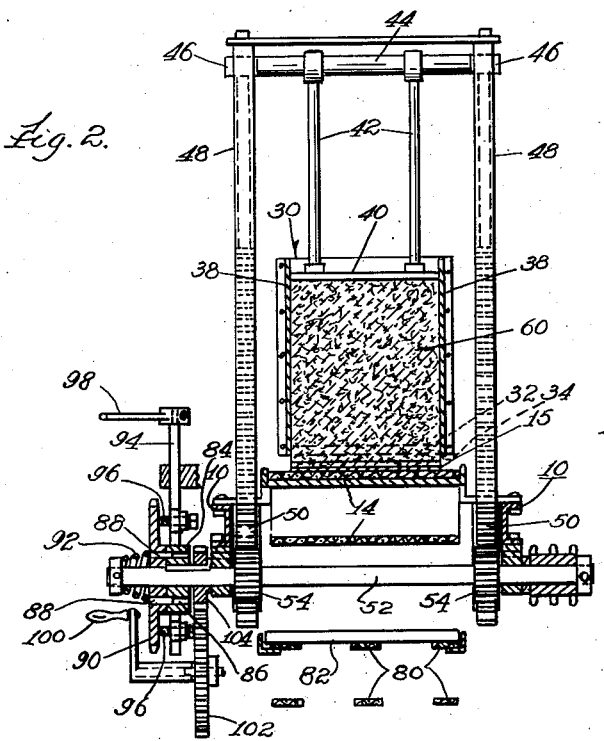
Fig. 2 is a transverse detail section taken as indicated at line 2—2 of Fig. 1.
Figure 3:
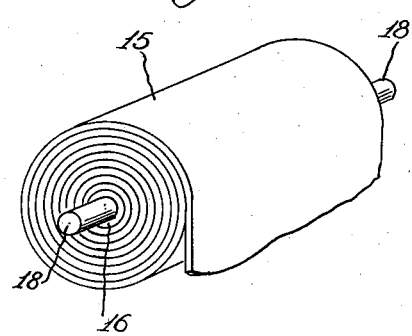
Fig. 3 is a perspective view of a supply roll of dough ready for insertion in the machine.

Fig. 2 illustrates a convenient arrangement to permit refilling the container 30 when its contents are exhausted. The shaft 52 carries (in addition to the pinions 54) a clutch member 84 which is keyed to the shaft and which is formed with a series of holes 86 to receive clutch pins or dowels 88 projecting from the face of a driving sprocket wheel 90. The sprocket 90 is loose on the shaft 52 and is held in engagement with the clutch member 84 by a spring 92. A rock shaft 94 suitably journaled on the frame of the machine carries projecting bolts 96 which may be brought into engagement with the face of the sprocket wheel 90 when the shaft 94 is rocked by means of its handle 98 and these projecting bolts 96 thus act as cams to force the pins 88 out of engagement with the clutch member 84. When this has been done the shaft 52 may be rotated in reverse direction by means of a hand crank 100 driving a gear 102 which meshes with a gear 104 keyed to the shaft 52 adjacent the clutch member 84. This reverse rotation of the shaft 52 carries the plunger 40 upwardly and out of the container 30. Since the links 42 are pivotally engaged with the cross bar 44, the plunger 40 may then be swung clear of the upwardly open container 30, as indicated in dotted lines in Fig. 1, so as to permit refilling the container 30.

Figs. 4 to 7 illustrate a convenient form of construction for the forming cylinder or roll 70. As shown in Fig. 6 the several parts are assembled upon a shaft 110 which carries a tube 111 with bushings 112 interposed between the tube and the shaft. Threaded collars 113 are adjusted on the threaded ends of the tube so that their flanges 114 bear against the outermost of the rings 116 on which the circular corrugated cutting blades 74 are formed at the ends of the roll 70. The roll itself is made in cast units each of which is in the form of a collar 118 having the pockets 71 formed therein; these collars are assembled on the tube 111 with the blade members 116 interposed between adjacent collars 118. The cutting edges, if they are to be corrugated, may be milled in this form so that the total thickness of one of the rings 116 is determined by the width required for the corrugated cutting edge 73. Plain circular cutting edges could be employed if desired, but the corrugated cut is preferred since it produces the traditional scalloped edge of the ravioli. Either before or after assembly on the shaft 110, slots 122 are milled in the collars 118 between adjacent pockets 71 thereof, and corresponding slots 124 are milled across the corrugated cutting faces of the rings 116 so that with these slots all in registration in the assembled cylinder, the cylinder presents a surface having longitudinal grooves disposed between adjacent longitudinal rows of the pockets 71. Blade bars 126 having the corrugated cutting edges 73 are then set in these grooves extending from end to end of the cylinder 70, and these bars 126 may be permanently secured in place by soldering or other suitable means. The completed cylinder then appears as shown in Fig. 4.

Fig. 5, being a transverse section of the cylinder 70, illustrates how it operates in forming the ravioli units. This view shows the apron 14 carrying the three layers of material, the layer 15 of dough, the intermediate layer 60 of filling material, and the top layer of dough 15a under the cylinder 70, causing the layers 15 and 15a to be pressed together with the layer 15a bulging upwardly into a pocket 71 to accommodate the filling material confined between the layers. Figs. 5 and 7 indicate how the circular cutters 116 and the cutter bars 126 contact the apron 14 to sever both layers of dough and separate the individual units of ravioli from each other.

Fig. 8 illustrates a modified form of hopper for feeding the filling material onto the lower layer of dough. In this construction the hopper is upwardly open and is shown with downwardly converging walls 130, 130. The bottom wall 131 has a feed slot 132 which may be understood as extending substantially over the width of the sheet 15 of dough indicated just below the hopper. In the upper portion of the hopper a pair of agitators 133 are shown journaled for rotation and provided with blades or paddles which tend to sweep the material downwardly in the hopper as they rotate in the mass. A second pair of agitators 134 are mounted closely adjacent the outlet slot 132 and may be connected by gears, not shown, so as to rotate in timed relation with their blades or paddles interengaging to feed the filling material downwardly toward the slot 132. The adjacent walls 136 of the hopper are rounded to conform to the paths of rotation of the blades of the agitators 134 so as to be swept clean by them, thus preventing accumulation of the material which could not be fed out of the hopper. It will be evident that a construction of this character, if substituted for the container 30 and its feed plunger 40, would permit of more nearly continuous operation since additional material could be introduced into the hopper without stopping the machine. With either type of feed device for the filling material, this material will be distributed at a predetermined rate in timed relation to the travel of the apron 14 which carries the sheet of dough 15. When the container 30 and plunger 40 are employed, the drive shaft 52 will be suitably connected by gears or chains with the mechanism which operates the apron 14; and similarly, if the hopper of Fig. 8 is employed, the agitators 133, and particularly the feeders 134 will be geared to the same driving mechanism which moves the apron 14 so as to insure a definite relation between the rate of feed of the filling material and the rate of travel of the apron.

I claim:

1. In a ravioli machine, a forming cylinder comprising a shaft, a plurality of circular units assembled on said shaft and each having a single series of outwardly open pockets extending circumferentially in its surface, a plurality of annular cutting members interposed between adjacent units and adjacent the outer ends of the end units of the cylinder, the pockets of said units being alined in rows extending parallel to the shaft axis, said units and cutting members having notches which form continuous slots extending longitudinally of the cylinder between adjacent rows, and cutting blades secured in said slots.

2. In a ravioli machine, a forming cylinder comprising a shaft, a plurality of circular units assembled on said shaft and each having a single series of outwardly open pockets extending circumferentially in its surface, a plurality of annular cutting members having sinuous cutting edges and interposed between adjacent units and adjacent the outer ends of the end units of the cylinder, the pockets of said units being aligned in rows extending parallel to the shaft axis, said units and cutting members having notches which form continuous slots extending longitudinally of the cylinders between adjacent rows, and cutting blades secured in said slots, said blades having outwardly exposed sinuous cutting edges intersecting the cutting edges of the annular members.

3. In a ravioli machine, a supply roller having a sheet of dough wrapped around it in a plurality of spirally disposed layers, a pair of squeezing rolls between which said sheet is fed and reduced in thickness, a traveling apron onto which the thinned sheet of dough is delivered from said squeezing rolls, a container for filling materials mounted over the apron and having a slot through which said material is delivered in a layer onto said dough, a second supply roller having a sheet of dough wound spirally thereon, a second pair of squeezing rolls between which the second sheet of dough is fed onto the layer of filling, and a forming cylinder rotatably mounted over the apron and having pockets into which the assembled layers of dough and filling are pressed, said cylinders including cutting means cooperating with the apron to separate the assembly into units as it is released from said pockets and is carried along by the apron.

4. In a ravioli machine, a supporting frame, an endless apron and supporting rollers in said frame on which said apron is carried for horizontal travel, means for assembling on the apron upper and lower layers of dough with filling material interposed between them, means for forming the assembly into individual units each composed of upper and lower layers with filling material between them and with the two layers of dough pressed together at their marginal portions to confine the filling, a conveyor belt mounted for travel under said apron and in the same general direction with removable trays on said belt to receive said units from the end of the apron and a fixed slide bridging the space between said end of the apron and the path of said trays to support said units during transfer from the apron to the trays.

5. In a ravioli machine, a horizontally traveling apron, means to feed a sheet of dough onto said apron, a container for filling material having a delivery slot in its bottom wall disposed over the apron, and having parallel side walls, a plunger fitting in said container between its side walls, a cross bar above the plunger, links connecting the cross bar to said plunger, toothed racks connected to said cross bar and guided for vertical movement at opposite sides of the container, a shaft with pinions thereon meshing with said racks, and means for rotating the shaft to force the plunger downward in the container for expressing the filling material through said slot in its bottom wall.

6. In a ravioli machine as defined in claim 5, said means for rotating the shaft including a power-driven wheel, disengageable clutch means normally connecting said wheel with the shaft, means for disengaging said clutch at will, and gearing for rotating the shaft in reverse direction to raise the plunger out of the container to permit refilling said container.

7. In a ravioli machine as defined in claim 5, means for rotating the shaft in reverse direction to raise the plunger out of the container, and guide means by which the cross bar is maintained in a position directly above the container, said links being pivotally engaged with the cross bar to permit swinging the plunger clear of the top of the container when thus elevated.

8. In a ravioli machine, a supply roller having a sheet of dough wrapped thereon in a plurality of spirally disposed layers, a pair of rolls between which the sheet is fed, a traveling apron onto which the fed sheet of dough is delivered from said rolls, a container for filling material mounted over the apron and having a slot through which said material is delivered in a layer onto said dough, and a roller disposed at a predetermined distance above said layer with means for rotating said roller at a peripheral speed less than the speed of travel of the dough for regulating the thickness of the layer of filling material thereon.

9. In a ravioli machine, a supporting frame, an endless apron, and supporting rollers in said frame on which said apron is carried for horizontal travel, means for assembling on the apron upper and lower layers of dough with filling material interposed between them, and means for forming the assembly into individual units each composed of upper and lower layers with filling material between them and with two layers of dough pressed together at their marginal portions to confine the filling, said means comprising a forming cylinder rotatably mounted over the apron and having pockets into which the assembled layers of dough and filling are pressed as the apron travels under the cylinder, said cylinder including cutting means cooperating with the apron to separate the assembly into units as it is released from said pockets and is carried along by the apron.

10. In a ravioli machine, a frame, supporting rollers journaled in the frame, and an endless apron carried on said rollers for horizontal travel and adapted to carry an assembly consisting of a lower layer of dough and an upper layer of dough with filling material interposed between them, a relatively rigid support under said apron over which it travels, and a cylinder rotatably mounted over said apron and directly above said support, said cylinder having forming pockets in its outer surface into which the assembled layers of dough and filling are adapted to be pressed and said cylinder including cutting blades extending around each pocket and cooperating with the apron and said rigid support to separate the assembled material into units as it is carried along by the apron.

SALVATORE MARINO.

REFERENCES CITED

The following references are of record in the file of this patent:

UNITED STATES PATENTS

| Number | Name | Date |
| --- | --- | --- |
| 1,771,506 | Mustin | July 29, 1930 |
| 1,809,263 | Acosta | June 9, 1931 |
| 1,844,142 | Barili | Feb. 9, 1932 |
| 1,858,507 | Jenney | May 17, 1932 |
| 2,001,792 | Lombi (1) | May 21, 1935 |
| 2,227,728 | Lombi (2) | Jan. 7, 1941 |
| 2,252,248 | Bridge | Aug. 12, 1941 |
| 2,298,644 | Hummel | Oct. 13, 1942 |

FOREIGN PATENTS

| Number | Country | Date |
| --- | --- | --- |
| 620,380 | France | Jan. 21, 1927 |
| 651,349 | France | Oct. 9, 1928 |